US009948180B2

(12) United States Patent
Lyle, Jr.

(10) Patent No.: US 9,948,180 B2
(45) Date of Patent: Apr. 17, 2018

(54) SWITCHING REGULATOR INPUT CURRENT SENSING CIRCUIT, SYSTEM, AND METHOD

(71) Applicant: Intersil Americas LLC, Milpitas, CA (US)

(72) Inventor: Robert L. Lyle, Jr., Raleigh, NC (US)

(73) Assignee: INTERSIL AMERICAS INC, Milpitas, CA (US)

( * ) Notice: Subject to any disclaimer, the term of this patent is extended or adjusted under 35 U.S.C. 154(b) by 34 days.

(21) Appl. No.: 14/519,299

(22) Filed: Oct. 21, 2014

(65) Prior Publication Data
US 2015/0035504 A1 Feb. 5, 2015

Related U.S. Application Data

(62) Division of application No. 12/550,081, filed on Aug. 28, 2009, now Pat. No. 8,866,453.

(60) Provisional application No. 61/092,650, filed on Aug. 28, 2008.

(51) Int. Cl.
*G05F 1/00* (2006.01)
*H02M 3/156* (2006.01)
*H02M 3/158* (2006.01)
*H02M 1/00* (2006.01)

(52) U.S. Cl.
CPC ........... *H02M 3/156* (2013.01); *H02M 3/158* (2013.01); *H02M 2001/0009* (2013.01)

(58) Field of Classification Search
CPC . G05F 1/452; H02M 2001/007; H02M 3/156; H02M 3/157

USPC ................. 323/224, 266, 282–286
See application file for complete search history.

(56) References Cited

U.S. PATENT DOCUMENTS

| 7,071,660 B2 * | 7/2006 | Xu ........................ H02M 3/156 323/266 |
| 7,161,335 B2 | 1/2007 | Wei et al. |
| 7,642,762 B2 | 1/2010 | Xie et al. |

(Continued)

*Primary Examiner* — Nguyen Tran
(74) *Attorney, Agent, or Firm* — Foley & Lardner LLP; Mark J. Danielson

(57) ABSTRACT

A Buck switching regulator includes first Buck switching regulator circuitry is operable to generate a first output voltage from an input voltage and operable to generate a first sensed voltage having a value that is proportional to an output current being provided by the first Buck switching regulator circuitry. The first Buck switching regulator circuitry receives an input current and operates at a first duty cycle determined by a duty cycle signal. Input current sensing circuitry includes second Buck switching regulator circuitry coupled to the first Buck regulator switching circuitry to receive the duty cycle signal and to receive the first sensed voltage as an input voltage to the second Buck switching regulator circuitry. The second Buck switching regulator circuitry is operable responsive to the duty cycle signal to generate a second output voltage from the first sensed voltage. The second output voltage has a value that is proportional to the input current being supplied to the first Buck switching regulator circuitry. Such a Buck switching regulator can be utilized in a variety of different types of electronic systems, such as laptop computer systems, and can also be used in charging systems in laptop computer and other types of electronic systems.

9 Claims, 6 Drawing Sheets

(56) References Cited

U.S. PATENT DOCUMENTS

2004/0070378 A1     4/2004   Baldwin et al.
2008/0278123 A1   11/2008   Mehas et al.

* cited by examiner

SWITCHING REGULATOR INPUT CURRENT SENSING CIRCUIT, SYSTEM, AND METHOD

PRIORITY CLAIM

The present application is a Divisional application of copending U.S. patent application Ser. No. 12/550,081, filed 28 Aug. 2009; which application claims the benefit of U.S. Provisional Patent Application No. 61/092,650, filed Aug. 28, 2008, all of the foregoing applications are incorporated herein by reference in their entireties.

TECHNICAL FIELD

Embodiments of the present invention are directed generally to switching regulators and more specifically to circuits and methods for determining the efficiency of such switching regulators so that this efficiency may then be used in controlling the operation of the switching regulator.

BACKGROUND OF THE INVENTION

A typical switching regulator converts a voltage from one level to another by controlling a switching element or elements to alternately store and release energy in an energy storage element, such as an inductive element. In operation, energy from an input power source is alternately stored in the inductive element and then released from the inductive element to thereby supply power to a load being driven. Many different topologies exist for switching regulators and may be generally classified as either step-up converters or step-down converters. Examples of step-up converters providing an output voltage Vout that is greater than a supplied input voltage Vin include Buck-boost and single ended primary inductor converters (SEPICs). Conversely, a Buck converter is an example of a step-down converter that provides an output voltage Vout that is less than the input voltage Vin.

In switching regulators, it is often desirable to measure an input current Iin coming into or being supplied from an input power source to the regulator during operation. This is particularly true when batteries are being used as the input power source and the amount of discharge current out of the batteries needs to be monitored and/or limited to, for example, extend the life of the batteries. Moreover, customers often have the need or desire to determine the power efficiency of their switching regulators, and to do so requires the ability to monitor the input voltage Vin and input current Iin supplied to the switching regulator along with the output voltage Vout and output current Iout provided by the regulator.

The power efficiency of a switching regulator is given by the output power Pout provided by the regulator divided by the input power Pin supplied to the regulator (Pout/Pin), where Pout=Iout×Vout and Pin=Iin×Vin. While customers would like to be able to determine power efficiency, they do not want to significantly increase the cost or complexity of their regulators to do so. Input voltage Vin, output voltage Vout and output current Iout are all presently monitored in most switching regulators, primarily because these parameters are easily measured and useful or required for controlling operation of the regulator. Input current Iin, however, is not typically monitored and needs to be in order to enable the power efficiency to be determined. The input current Iin to a switching regulator is a pulsed current not a direct current (DC) signal and accordingly is not easily measured, as will be appreciated by those skilled in the art. For the input current Iin an average value must be determined for use in calculating power efficiency with this average value being based upon the magnitude and duty cycle of the input current. This additional circuitry increases the complexity of circuitry forming the switching regulator, occupies valuable space in an integrated circuit in which the switching regulator or portions thereof are typically formed, and increases the cost of the regulator.

Alternative circuits and methods are needed for the input and output current and voltage measurements such that overall efficiency of a switching regulator can be determined.

SUMMARY

According to one embodiment of the present invention, a Buck switching regulator includes first Buck switching regulator circuitry is operable to generate a first output voltage from an input voltage and operable to generate a first sensed voltage having a value that is proportional to an output current being provided by the first Buck switching regulator circuitry. The first Buck switching regulator circuitry receives an input current and operates at a first duty cycle determined by a duty cycle signal. Input current sensing circuitry includes second Buck switching regulator circuitry coupled to the first Buck regulator switching circuitry to receive the duty cycle signal and to receive the first sensed voltage as an input voltage to the second Buck switching regulator circuitry. The second Buck switching regulator circuitry is operable responsive to the duty cycle signal to generate a second output voltage from the first sensed voltage. The second output voltage has a value that is proportional to the input current being supplied to the first Buck switching regulator circuitry. Such a Buck switching regulator can be utilized in a variety of different types of electronic systems, such as laptop computer systems, and can also be used in charging systems in laptop computer and other types of electronic systems.

According to another embodiment of the present invention, a method of sensing the input current being supplied to a first Buck switching regulator includes controlling the first Buck switching regulator at a first duty cycle to generate a first voltage having a value indicating the value of an output current being provided by the first Buck switching regulator, providing the first voltage as an input voltage to a second Buck switching regulator, and controlling the second Buck switching regulator at the first duty cycle to generate a second output voltage, the second output voltage having a value that is proportional to the value of the input current being supplied to the first Buck switching regulator.

DETAILED DESCRIPTION

Figure 1:
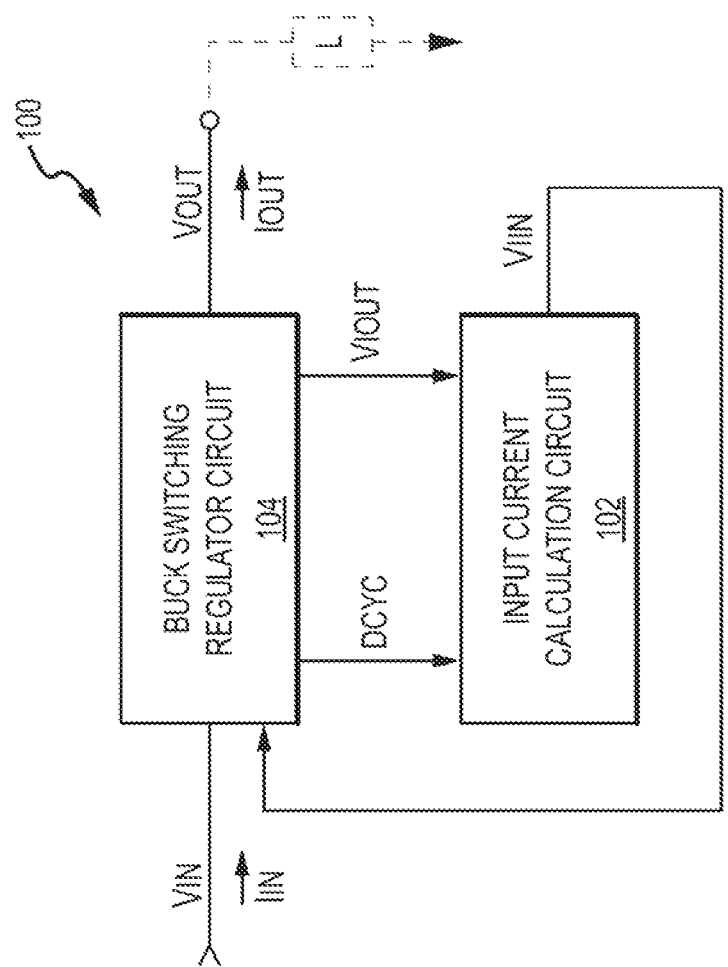
FIG. 1 is a functional block diagram of a Buck switching regulator including an input current sensing circuit according to an embodiment of the present invention.

FIG. 1 is a functional block diagram of a Buck switching regulator 100 including an input current sensing circuit 102 for calculating an input current Iin being supplied to a primary or first Buck switching regulator circuit 104 according to an embodiment of the present invention. The first Buck switching regulator circuit 104 generates a first output voltage Vout and an output current Iout from an input voltage Vin and input current Iin, with the output voltage and current being supplied to drive a load L. In operation, the first Buck switching regulator circuit 104 operates at a duty cycle to generate the desired first output voltage Vout, and generates duty cycle signals DCYC having ON/OFF times indicating the duty cycle at which the Buck switching regulator circuit 104 is operating. In addition, the first Buck switching regulator circuit 104 generates a first sensed voltage $V_{IOUT}$ having a value that indicates the value of the output current Iout the first Buck switching regulator circuit is supplying to the load L. In response to the duty cycle signals DCYC and first sensed output voltage $V_{IOUT}$, the input current sensing circuit 102 generates a second output voltage $V_{IIN}$ having a value that indicates the value of the input current Iin being supplied to the Buck switching regulator circuit 104.

The input current sensing circuit 102 utilizes only the duty cycle signal DCYC and first sensed output voltage $V_{IOUT}$ of the first Buck switching regulator circuit 104 to generate the second output voltage $V_{IIN}$ that is proportional to the input current Iin being supplied to the first Buck switching regulator. With the input current sensing circuit 102 there are no separate components required for directly sensing the input current Iin. While the separate input current sensing circuit 102 is required to sense the input current Iin, relatively simple circuitry forms the input current sensing circuit according to embodiments of the present invention. This reduces the size, complexity and thus overall cost of the Buck switching regulator 100.

Even though various embodiments and advantages of the present invention are set forth in the following description, the present disclosure is illustrative only, and changes may be made in detail and yet remain within the broad principles of the present invention. Therefore, the present invention is to be limited only by the appended claims. Furthermore, in the present description certain details have been set forth in conjunction with the described embodiments of the present invention to provide a sufficient understanding of the invention. One skilled in the art will appreciate, however, that the invention itself and various aspects thereof may be practiced without these particular details. Furthermore, one skilled in the art will appreciate that the sample embodiments described do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail herein. Finally, the operation or structure of well known components and/or processes has not been shown or described in detail herein to avoid unnecessarily obscuring the present invention.

Figure 2:
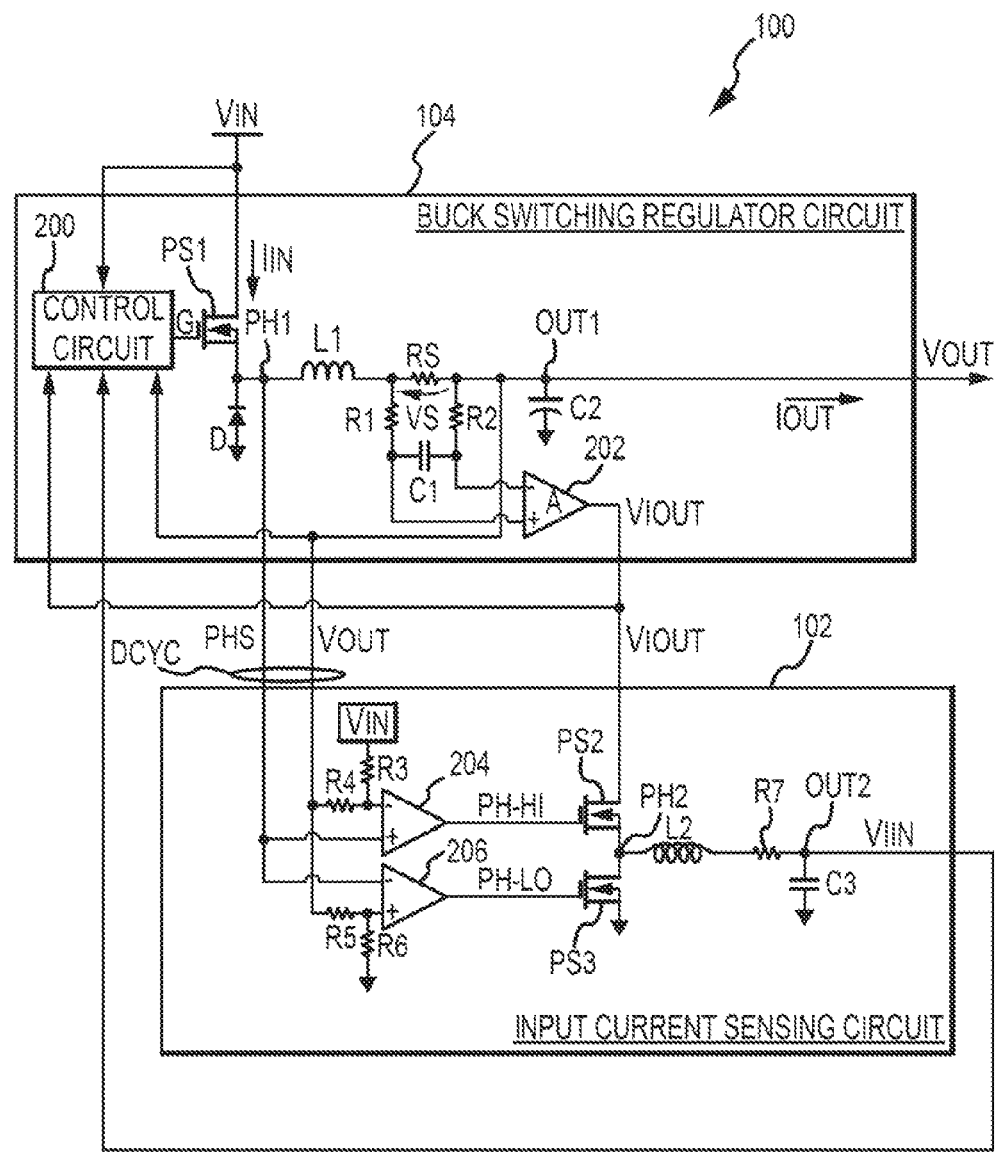
FIG. 2 is a more detailed functional block diagram and schematic of the Buck switching regulator of FIG. 1 according to one embodiment of the present invention.

FIG. 2 is a more detailed functional block diagram and schematic of the Buck switching regulator 100 of FIG. 1 according to one embodiment of the present invention. In this embodiment, the first Buck switching regulator circuit 104 includes a first power switch PS1 and a diode D connected in series between the input power source (not shown) supplying the input voltage Vin and input current Iin and a ground reference plane. The power switch PS1 is a power MOSFET in the example of FIG. 2, although different types of transistors and switching circuits may be utilized in other embodiments. A control circuit 200 applies a gating signal G to control the turning ON/OFF of the power switch PS1. The duty cycle D of the gating signal G defines the duty cycle at which the first Buck switching regulator circuit 104 operates. A first phase node PH1 is defined at the interconnection of the power switch PS1 and the diode D, with the voltage on this node varying as the power switch PS1 is alternately turned ON and OFF responsive to the gating signal G.

When the control circuit 200 activates the G to turn ON the power switch PS1, magnetic energy is stored in a first conductor L1 connected in series with a sense resistor RS between the first phase node PH1 and a first output node OUT1 on which the output voltage Vout is generated. Conversely, when the control circuit 200 deactivates the gating signal G to turn OFF the power switch PS1, magnetic energy is released from the first conductor L1 via a current flowing through the diode D. A sense voltage Vs develops across the sense resistor RS in response to the output current Iout flowing through the sense resistor and into a load (not shown in FIG. 2) connected to the output node OUT1 of the first Buck switching regulator circuit 104. The sense voltage Vs is applied through a filter network formed by resistors R1, R2 and a capacitor C1 to an amplifier 202 having a gain A. The amplifier 202 generates a first sensed voltage $V_{IOUT}$ having a value that is proportional to the value of the output current Iout flowing through the sense resistor Rs. A capacitor C2 is connected between the output node OUT1 and ground reference plane and functions to filter the output voltage Vout generated on the output node.

As seen in FIG. 2 a phase signal PHS on the phase node PH1 and output voltage Vout on the output node OUT1 collectively form the duty cycle signal DCYC (see FIG. 1) that is applied to the input current sensing circuit 102. More specifically, the phase signal PHS is applied to a first input of a first comparator 204 while the output voltage Vout on the node OUT1 is coupled through a first voltage divider formed by resistors R3 and R4 to provide a first reference voltage on a second input of the comparator. Similarly, the output voltage Vout on the node OUT1 is coupled through a second voltage divider formed by resistors R5 and R6 to provide a second reference voltage on a first input of a second comparator 206 and the phase signal PHS is applied to a second input of the second comparator 204.

In response to the PHS signal and output voltage Vout, the first and second comparators 204 and 206 generate a phase-high signal PH-HI and phase-low signal PH-LO, respectively. Note that the duty cycle D of the gating signal G defines the duty cycle of the first Buck switching regulator circuit 104 and that the duty cycle signal DCYC formed by the PHS signal and the output voltage Vout also indicate the duty cycle D of the first Buck switching regulator circuit 104. Two power switches PS2 and PS3 in the input current sensing circuit 102 are connected in series between the output of the amplifier 202 and a ground reference plane and are alternately activated and deactivated responsive to the PH-HI and PH-LO signals. The PH-HI and PH-LO signals are complementary signals and thus when the PH-HI signal is activated, turning ON the power switch PS2, the PH-LO signal is deactivated, turning OFF the power switch PS3. Conversely, when the PH-HI signal is deactivated, turning OFF the power switch PS2, the PH-LO signal is activated, turning ON the power switch PS3.

A second phase node PH2 is formed at the interconnection of the power switches PS2 and PS3 and a second conductor L2 and resistor R7 are connected in series between the second phase node and a second output node OUT2 of the input current sensing circuit 102. A capacitor C3 and the resistor R7 form a low pass filter that filters the signal from the inductor L2 to generate a second output voltage $V_{IIN}$ on the second output node OUT2, with the second output voltage having a value that is proportional to the input current Iin being supplied to the first Buck switching regulator circuit 104, as previously mentioned above and as will be described in more detail below. The second output voltage $V_{IIN}$ is applied to the control circuit 200 in the first Buck switching regulator circuit 104, and the control circuit utilizes the second output voltage along with the first sensed voltage $V_{IOUT}$ from the amplifier 202 and the output voltage Vout on the output node OUT1 in controlling the overall operation of the Buck switching regulator circuit, as will now be explained in more detail.

In operation of the Buck switching regulator 100, the control circuit 200 in the first Buck switching regulator circuit 104 controls the operation of the Buck switching regulator circuit responsive to the input voltage Vin, output voltage Vout, and the voltages $V_{IIN}$ and $V_{IOUT}$ to generate the desired values for the output voltage Vout and output current Iout. Note that the first sensed voltage $V_{IOUT}$ has a value that is proportional to the value of the output current Iout while the second output voltage $V_{IIN}$ has a value proportional to the input current Iin. As a result, the control circuit 200 of the first Buck switching regulator circuit 104 receives information about the input current Iin, input voltage Vin, output current Iout, and output voltage Vout of the Buck switching regulator circuit and can thus utilize this information in determining the efficiency of the Buck switching regulator circuit.

The control circuit 200 can utilize the information about the input current Iin from the second output voltage $V_{IIN}$ to limit the value of the input current being supplied to the first Buck switching regulator circuit 104. In addition, the control circuit 200 can utilize the determined efficiency to control the overall operation of the first Buck switching regulator circuit 104 to improve the efficiency of the Buck switching regulator circuit and thereby reduce the power consumption of the overall Buck switching regulator 100. The control circuit 200 can also provide efficiency information to external circuitry (not shown) containing or coupled to the Buck switching regulator 100 and such external circuitry could, for example, utilize this efficiency information in controlling the overall operation of a system of which the external circuitry and a switching regulator are a part.

Note that one skilled in the art will understand the theory and operation of the first Buck switching regulator circuit 1014 and thus, for the sake of brevity, its detailed operation will not be described in more detail herein. The general theory and operation of Buck switching regulator circuits will, however, be described below in detail with regarding to discussing the operation of the input current sensing circuit 102, which from examination of FIG. 2 is seen to include circuitry corresponding to the circuitry of a synchronous Buck switching regulator circuit, as will be appreciated by those skilled in the art. In a synchronous Buck switching regulator circuit, the diode D shown in the circuit 104 is replaced with a power switch PS, as is seen to be the case for input current sensing circuit 102 in which the power switch PS3 is contained in place of a diode.

In the embodiment of FIG. 2 the circuitry of the input current sensing circuit 102 corresponds to the circuitry of a synchronous Buck switching regulator circuit receiving the duty cycle signal DCYC and the first sensed voltage $V_{IOUT}$. Note that the first sensed voltage $V_{IOUT}$ provided by the first Buck switching regulator circuit 104 is supplied to the input current sensing circuit 102 as the input voltage of the second Buck switching regulator circuit forming the input current sensing circuit. By providing the first sensed voltage $V_{IOUT}$ from the first Buck switching regulator circuit 104 as the input voltage Vin to the second Buck switching regulator circuit forming the input current sensing circuit 102, and by operating the second Buck switching regulator circuit at the same duty cycle D as the first Buck switching regulator circuit 104 through the duty cycle signal DCYC, the second Buck switching regulator circuit generates the second output voltage $V_{IIN}$ having a value proportional to the input current Iin of the first Buck switching regulator circuit 104, as will now be explained in more detail below.

The second Buck switching regulator circuit forming the input current sensing circuit 102 in essence functions as multiplier to generate the second output voltage $V_{IIN}$ having a value proportional to the input current Iin of the first switching Buck regulator circuit 104. For a conventional Buck switching regulator circuit, the following equations characterize the circuit:

$$Vout = D \times Vin \quad (1)$$

$$D = T_{ON}/(T_{ON} + T_{OFF}) = T_{PH-HI}/(T_{PH-HI} + T_{PH-LO}) \quad (2)$$

$$PIN = Vin \times Iin \quad (2)$$

$$POUT = Vout \times Iout \quad (3)$$

$$POUT/PIN = EFF \quad (4)$$

$$Iin = Iout \times (Vout/Vin) \times (1/EFF) \quad (5)$$

Equation 1 defines the general relationship between the input voltage Vin and output voltage Vout of a Buck switching regulator circuit, namely that the output voltage Vout equals the input voltage Vin times the duty cycle D at which the switching regulator circuit is operating. As the equation 2 illustrates, the duty cycle D is defined for the second synchronous switching Buck regulator circuit as the time $T_{PH-HI}$ the phase-high signal PH-HI is active divided by a total cycle time given by the time $T_{PH-HI}$ plus the time $T_{PH-LO}$ the phase-low signal PH-LO is active. The efficiency EFF of a Buck switching regulator circuit is given by equation 4 and is defined as the output power POUT divided by the input power PIN. Utilizing equations 2-4 the input current Iin as a function of output current Iout, output voltage Vout, input voltage Vin and efficiency EFF is given in equation 5. While equation 5 does indeed characterize the input current Iin in terms of these other measured parameters, the computations required to determine the value of the input current Iin are relatively complex components such as analog multipliers and dividers, which are also prone to introducing error into the computation due to component and temperature variations, for example.

By utilizing the second Buck switching regulator circuit to form the input current sensing circuit 102, the computations and circuitry required to determine the value of the input current Iin are greatly simplified. From the above description and equations for conventional Buck switching regulator circuits, is seen that the second Buck switching regulator circuit forming the input current sensing circuit 102 receives the first sensed voltage $V_{IOUT}$ as the input voltage of the regulator circuit. Moreover, referring to the circuitry in regulator circuit 204 of FIG. 2 the value of the first sensed voltage $V_{IOUT}$ is given by the following equation:

$$V_{IOUT}=(Iout \times RS \times A) \quad (6)$$

where A is the gain of the amplifier 202.

Now for the second Buck switching regulator circuit forming the input current sensing circuit 102, from equations 1 and 6 the following equation for the second output voltage VIIN is found:

$$VIIN = VIOUT \times D = (Iout \times RS \times A) \times (Vout/Vin) \quad (7)$$

where the duty cycle D of the second Buck switching regulator circuit forming the input current sensing circuit 102 is the same as the duty cycle of the first Buck switching regulator circuit 104 and is thus given by Vout/Vin for the first Buck switching regulator circuit.

Now from equation 5 is seen that Iin=Iout×(Vout/Vin)× (1/EFF) or (Vout/Vin)=(Iin×EFF)/Iout, so replacing (Vout/Vin) in equation 7 yields:

$$V_{IIN}=(Iout \times RS \times A) \times ((Iin \times EFF)/Iout)=Iin \times RS \times A \times EFF \quad (8)$$

which shows that the second output voltage $V_{IIN}$ has a value that is proportional to the input current Iin of the first Buck switching regulator circuit 104.

From equation 8 it is seen that the second Buck switching regulator circuit forming the input current sensing circuit 102, when operating at the same duty cycle D as the first Buck switching regulator circuit 104 and when receiving the first sensed voltage $V_{IOUT}$ as an input voltage, generates the second output voltage $V_{IIN}$=Iin×RS×A×EFF. In this way, the relatively simple circuitry forming the second Buck switching regulator circuit of the input current sensing circuit 102 generates the second output voltage $V_{IIN}$ having a value that is proportional to the input current Iin of the first Buck switching regulator circuit 104. As will be appreciated by those skilled in the art, the efficiency EFF term in equation 8 creates an error that can be compensated for in a variety of different ways, such as characterizing the efficiency of the first Buck switching regulator circuit 104 as a function of output current Iout and storing this information in the control circuit 200. As previously mentioned, the second output voltage $V_{IIN}$ can be utilized by other circuitry (not shown) to calculate the overall efficiency EFF of the first Buck switching regulator circuit 104 as is desirable in many applications. For example, in battery-powered applications external circuitry may monitor the efficiency EFF at which the first Buck switching regulator circuit 104 is operating and then control the switching regulator circuit accordingly to conserve battery power.

Note that although the second Buck switching regulator circuit forming the input current sensing circuit 102 is shown as including the second conductor L2, in another embodiment this inductor is omitted and the resistor R7 connected directly to the second phase node PH2. From the above description and as will be understood by those skilled in the art, where the input current sensing circuit 102 is the second Buck switching regulator, the circuit functions as a chopping and averaging circuit that performs a "chopping" and averaging function on the first sensed output voltage $V_{IOUT}$ from the first Buck switching regulator circuit 104. The synchronous Buck switching regulator circuit is one embodiment of the input current sensing circuit 102 and other types of chopping and averaging circuits may be utilized to perform the desired function and implement equation (8), as will be appreciated by those skilled in the art.

Figure 3:
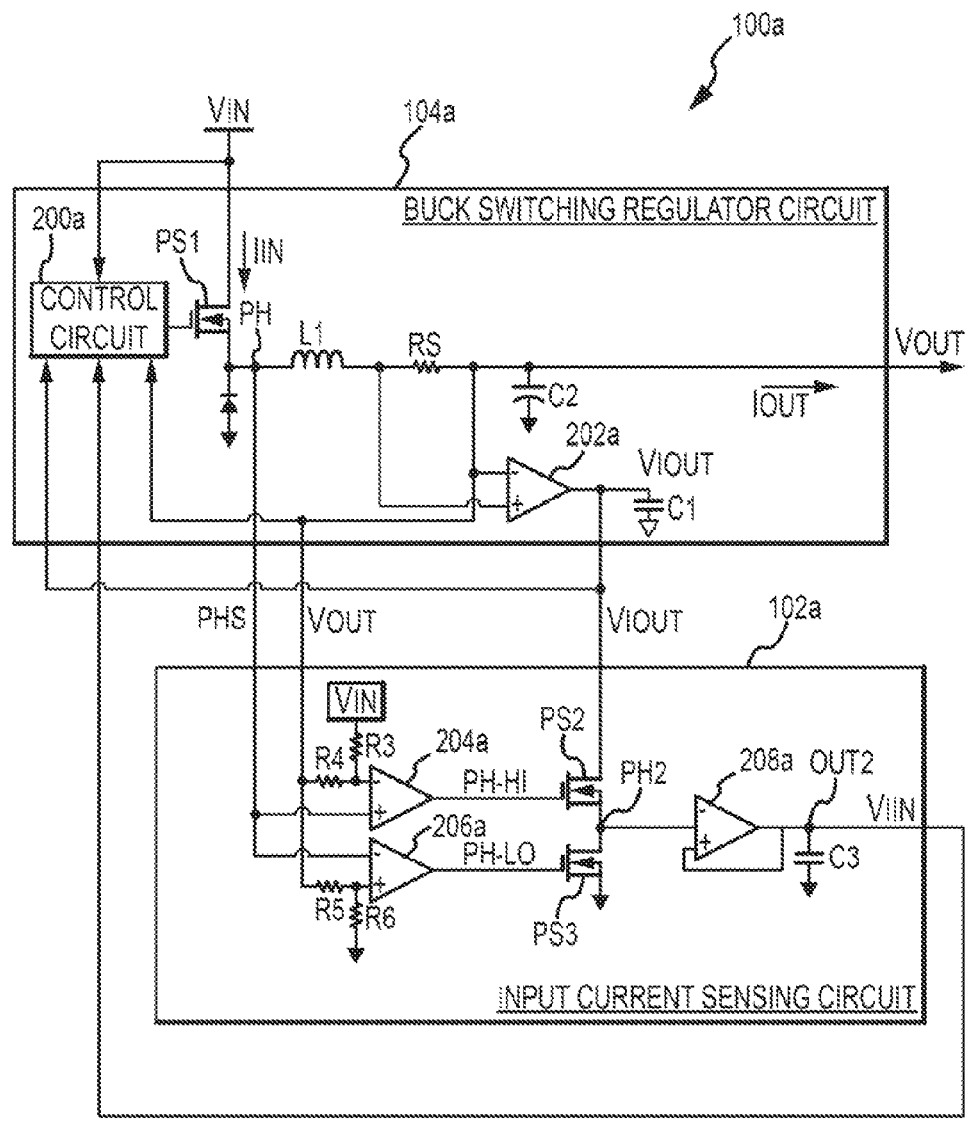
FIG. 3 is functional block diagram and schematic of another embodiment of the Buck switching regulator including components for implementing the regulator circuitry in an integrated circuit.

FIG. 3 is functional block diagram and schematic of a Buck switching regulator 100a including components for implementing the regulator circuitry in an integrated circuit according to another embodiment of the present invention. The Buck switching regulator 100a includes an input current sensing circuit 102a and first Buck switching regulator circuit 104a that are very similar to the input current sensing circuit 102 and first Buck switching regulator circuit 104 in the embodiment of FIG. 2. Accordingly, like components in the circuits 102a and 104a have been given the same designations as the corresponding components in the circuits 102 and 104. In the circuit 104a the filter components R1, R2 and C1 are omitted and amplifier 202 is replaced with a transconductance amplifier 202a having a capacitor C1 connected across its output. Similarly, the only difference between the input current sensing circuits 102 and 102a is that in the latter the inductor L2 and resistor R7 are omitted and a transconductance amplifier 208a is coupled to drive the output node OUT2 as shown. In this way, resistive, capacitive, and inductive components are eliminated from the first Buck switching regulator circuit 104a and the input current sensing circuit 102a to facilitate formation of these circuits in an integrated circuit. While the operation of components within the circuits 102a and 104a may vary slightly, such as for the control circuit 200a, the operation is substantially the same as previously described with reference to FIG. 2 and thus, for the sake of brevity, will not again be described in detail.

Figure 4:
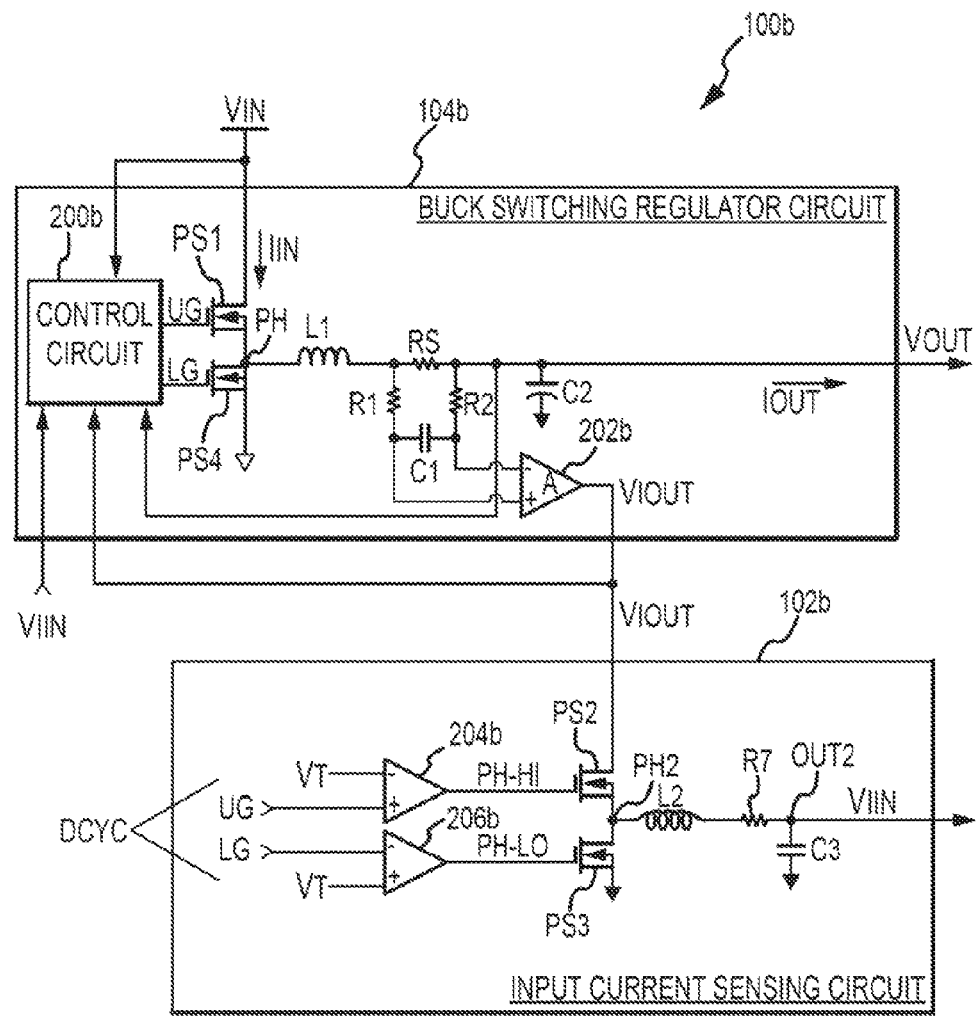
FIG. 4 is a more detailed functional block diagram and schematic of the Buck switching regulator of FIG. 1 according to another embodiment of the present invention.

FIG. 4 is a more detailed functional block diagram and schematic of a Buck switching regulator 100b according to another embodiment of the present invention. In the Buck switching regulator 100b, the input current sensing circuit 102b is the same as the circuit 102 of FIG. 2 while the first Buck switching regulator circuit 104b is a synchronous Buck switching regulator circuit including a power switch PS4 in place of the diode D in the circuit 104 of FIG. 2. Like components in the circuits 102b and 104b have been given the same designations as the corresponding components in the circuits 102 and 104. In the synchronous Buck switching regulator circuit 104b, the control circuit 200b generates an upper gate control signal UG to drive the power switch PS1 and a lower gate signal to drive the power switch PS4. The UG and LG signals determine the duty cycle of operation of the circuit 104b, and are applied are applied to the comparators 204b and 206b, respectively, to operate the second Buck switching regulator circuit forming the input current sensing circuit 102b at the same duty cycle. While the operation of components within the circuits 102a and 104c may vary slightly, such as for the control circuit 200c, the operation is substantially the same as previously described with reference to FIG. 2 and any such slight variations will be appreciated by those skilled in the art. Thus, for the sake of brevity, the operation of the regulator 100b and components thereof will not be described in more detail herein.

Figure 5:
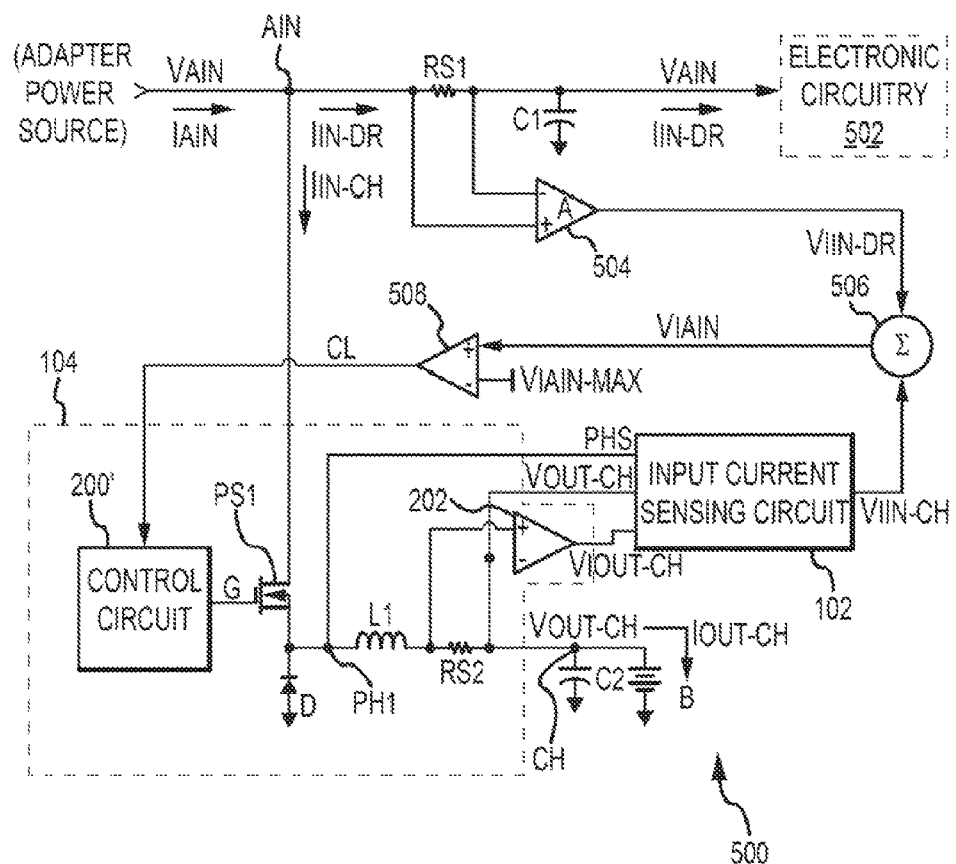
FIG. 5 is functional block diagram and schematic of a charging control system including the Buck switching regulator and input current sensing circuit of FIGS. 1-3 according to another embodiment of the present invention.

FIG. 5 is functional block diagram and schematic of a charging control system 500 including the Buck switching regulator circuit 104/104a/104b and input current sensing circuit 102/102a/102b of FIGS. 1-4 according to another embodiment of the present invention. Only the circuits 102 and 104 are designated in FIG. 5 and the following discussion will only refer to these particular embodiments although any embodiments of these circuits may be utilized in the charging system control system 500.

In the charging control system 500, an adapter power source (not shown) supplies an adapter input voltage $V_{AIN}$ and an adapter input current $I_{AIN}$ to an adapter input node AIN. This adapter input voltage $V_{AIN}$ and a first portion of the adapter input current $I_{AIN}$ are supplied to electronic circuitry 502 that is coupled to the adapter input node AIN through a first sense resistor RS1. The first portion of the adapter input current $I_{AIN}$ supplied to the electronic circuitry 502 is designated a drive input current $I_{IN-DR}$ and in response to this current flowing through the first sense resistor RS1 an amplifier 504 generates a first sensed voltage $V_{IN-DR}$ having a value that is proportional to the value of the drive input current $I_{IN-DR}$. As will be appreciated by those skilled in the art, the first sense resistor RS1 has a suitably small value such that approximately the full value of the adapter input voltage AIN is applied to the electronic circuitry 502, as indicated in FIG. 5. A first capacitor C1 is connected across the input to the electronic circuitry 502 and functions as a filter of the adapter input voltage $V_{AIN}$ and current $I_{IN-DR}$.

The Buck switching regulator circuit 104 receives the adapter input voltage $V_{AIN}$ and a second portion of the adapter input current $I_{AIN}$ that is designated a charging input current $I_{IN-CH}$ in FIG. 5. From the adapter input voltage $V_{AIN}$ and charging input current $I_{IN-CH}$ the Buck switching regulator circuit 104 functions to provide a charging output voltage $V_{OUT-CH}$ and charging output current $I_{OUT-CH}$ on a charging node CH. An energy storage element such as a battery B is coupled to the charging node CH and is recharged through the charging output voltage $V_{OUT-CH}$ and charging output current $I_{OUT-CH}$.

The input current sensing circuit 102 receives the phase signal PHS and charging output voltage $V_{OUT-CH}$ from the first Buck switching regulator circuit 104 along with a second sensed voltage $V_{IOUT-CH}$ having a value that is proportional to the charging output current $I_{OUT-CH}$. Utilizing these signals from the first Buck switching regulator circuit 104, the input current sensing circuit 102 operates as previously described to generate a second output voltage $V_{IN-CH}$ having a value that is proportional to the charging input current $I_{IN-CH}$ being supplied to the first Buck switching regulator circuit 104.

A summation circuit 506 receives the first sensed voltage $V_{IN-DR}$ and second output voltage $V_{IN-CH}$ and adds these two voltages to generate a summed voltage signal $V_{IAIN}$ having a value that is proportional to the adapter input current $I_{AIN}$ being supplied to the charging control system 500 from the adapter power source. The summed voltage signal $V_{IAIN}$ has a value proportional to the adapter input current $I_{AIN}$ because the first sensed voltage $V_{IN-DR}$ indicates the value of the drive input current $I_{IN-DR}$ and the second output voltage $V_{IN-CH}$ indicates the value of the charging input current $I_{IN-CH}$. The adapter input current $I_{AIN}=I_{IN-CH}+I_{IN-DR}$ and so the summation of the voltages $V_{IN-CH}$ and $V_{IN-DR}$ is the voltage $V_{IAIN}$ having a value proportional to the adapter input current $I_{AIN}$.

A comparator 508 compares the value of the summed voltage signal $V_{IAIN}$ to a total adapter current threshold $V_{IAIN-MAX}$ and generates a current limit signal CL in response to the comparison. When the summed voltage signal $V_{IAIN}$ is less than the threshold $V_{IAIN-MAX}$, the comparator 508 deactivates the current limit signal CL. In this situation the sum of the drive input current $I_{IN-DR}$ and charging input current $I_{IN-CH}$, which equals the adapter input current $I_{AIN}$, is less than some desired maximum value corresponding to the threshold $V_{IAIN-MAX}$ and thus the charging control system 500 continues operating to provide the required power to the electronic circuitry 502 and battery B. In contrast, when the summed voltage signal $V_{IAIN}$ is greater than the threshold $V_{IAIN-MAX}$, the comparator 508 activates the current limit signal CL. In this situation the sum of the drive input current $I_{IN-DR}$ and charging input current $I_{IN-CH}$ is greater than the desired maximum value and the operation of the first Buck switching regulator circuit 104 is adjusted accordingly. More specifically, the duty cycle D of the first Buck switching regulator circuit 104 is reduced to thereby lower the charging output current $I_{OUT-CH}$ being supplied to the battery B and the charging input current $I_{IN-CH}$ being supplied to the first Buck switching regulator circuit. More specifically, in response to the current limit signal CL a control circuit 200' in the first Buck switching regulator circuit 104 just the duty cycle D of the gating signal G applied to the power switch PS1. The control circuit 200' is substantially similar to the control circuit 200 previously described with reference to FIG. 2 except that the control circuit 200' also operates as just described to control the first Buck switching regulator circuit 104 to limit the charging input current $I_{IN-CH}$ and thereby keep the overall adapter input current $I_{AIN}$ less than a desired maximum value corresponding to the total adapter current threshold $V_{IAIN-MAX}$.

The charging control system 500 operates to ensure that the required drive input current $I_{IN-DR}$ is supplied to the electronic circuitry 502 while also ensuring that the adapter input current $I_{AIN}$ being provided by the adapter power source (not shown) does not exceed a maximum value. In this way, as the drive input current $I_{IN-DR}$ required by the electronic circuitry 502 varies, the control system 500 adjust the charging output current $I_{OUT-CH}$ supplied to the battery B to charge the battery as quickly as possible. For example, when the electronic circuitry 502 corresponds to computer circuitry in a laptop computer, the drive input current $I_{IN-DR}$ will vary depending upon the processing requirements of the electronic circuitry. During periods of low $I_{IN-DR}$ requirements, the control system 500 enables the first Buck switching regulator circuit 104 to provide a higher charging output current $I_{OUT-CH}$ to thereby charge the battery B more quickly. Conversely, during periods of high $I_{IN-DR}$ requirements, such as when the computer circuitry is operating a processor intensive application like voice recognition software, the control system 500 reduces the charging input current $I_{IN-CH}$ to maintain the adapter input current $I_{AIN}$ less than the threshold or maximum value.

Figure 6:
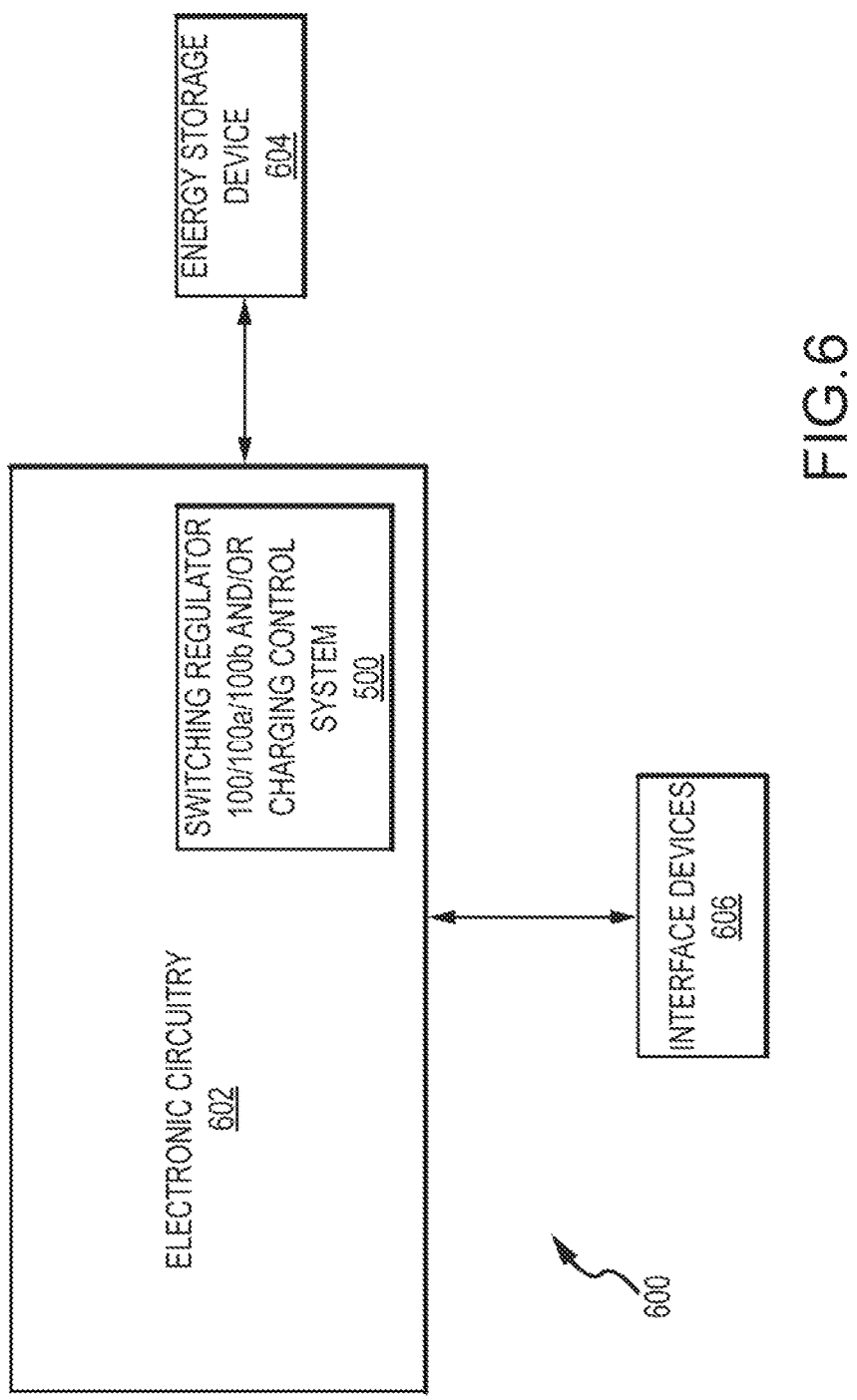
FIG. 6 is a functional block diagram of an electronic system including the Buck switching regulator of FIGS. 1-4 and/or battery charging control system of FIG. 5 according to another embodiment of the present invention.

FIG. 6 is a functional block diagram of an electronic system 600 including the switching regulator 100/100a/100b of FIGS. 1-4 and/or the charging control system 500 of FIG. 5 according to another embodiment of the present invention. The electronic system 600 includes electronic circuitry 602 including the switching regulator 100/100a/100b and/or the charging control system 500. The electronic circuitry 602 may be a variety of different types of circuitry depending upon the particular application for which the 100/100a/100b and/or the charging control system 500 is being utilized. For example, in one embodiment the electronic circuitry 602 corresponds to computer circuitry in a laptop computer or other type of portable electronic device. In such systems, an energy storage element 604, such as a rechargeable battery, may be coupled to the electronic circuitry 602 and switching regulator 100/100a/100b and/or charging control system 500 to thereby charge the energy storage element. The system 600 may further include interface devices 606 that may take a variety of different forms, such as an LCD screen and an alphanumeric keypad, which function to allow a user to interface with the system.

Even though various embodiments and advantages of the present invention have been set forth in the foregoing description, the above disclosure is illustrative only, and changes may be made in detail and yet remain within the broad principles of the present invention. Moreover, the functions performed by the elements illustrated and described with reference to FIGS. 1-5 may in some instances be combined and performed by fewer elements, separated and performed by more elements, or combined into different functional blocks depending upon the actual components used and system being designed, as will be appreciated by those skilled in the art. Therefore, the present invention is to be limited only by the appended claims.

What is claimed is:

1. A method for estimating an average input current of a Buck switching regulator operating with duty cycle D at a switching frequency F, the method comprising:
    sensing an inductor current of an inductor of the buck switching regulator;
    generating an inductor-current sense voltage responsive to the sensing of the inductor current;
    coupling the inductor-current sense voltage to a node at the frequency F and the duty cycle D to thereby generate a substantially rectangular-wave sense waveform; and
    generating an average voltage of the substantially rectangular-wave sense waveform, the average voltage being representative of the estimated average input current of the Buck switching regulator; and while the inductor-current sense voltage is uncoupled from the node, coupling a reference voltage to the node at the frequency F and at one minus the duty cycle D to thereby generate, at the node, the substantially rectangular-wave sense waveform.

2. The method of claim 1, wherein generating an average voltage of the substantially rectangular-wave sense waveform comprises low-pass filtering the substantially rectangular-wave sense waveform.

3. A Buck switching regulator, comprising:
    a Buck switching-regulator circuit configured
        to generate an output voltage from an input voltage,
        to generate a sensed voltage having a value that is mathematically proportional to an inductor current of the Buck switching-regulator circuit,
        to receive an input current, and
        to operate at a duty cycle determined by a duty-cycle signal; and
    an averaging circuit coupled to the Buck switching-regulator circuit and configured to receive the sensed voltage and the duty-cycle signal,
        to couple the sensed voltage to a node at a frequency and at the duty cycle to thereby generate a substantially rectangular sense voltage, and
        to generate an average voltage of the substantially rectangular sense voltage, where the average voltage represents an estimate of an average of the input current received by the Buck switching-regulator circuit; and wherein the averaging circuit is further configured to couple a reference voltage to the node while the sense voltage is uncoupled from the node to thereby generate, at the node, the substantially rectangular-wave sense waveform.

4. The Buck switching regulator of claim 3 wherein the averaging circuit is configured to couple the sensed voltage to the node at the frequency and at the duty cycle to thereby generate, at the node, the substantially rectangular sense voltage.

5. The Buck switching regulator of claim 3 wherein the averaging circuit is further configured to couple a reference voltage to the node at the frequency and at one minus the duty cycle while the sense voltage is uncoupled from the node to thereby generate, at the node, the substantially rectangular-wave sense waveform.

6. The method of claim 1 wherein coupling the inductor-current sense voltage includes coupling the inductor-current sense voltage to the node at the frequency F and at the duty cycle D to thereby generate, at the node, a substantially rectangular-wave sense waveform.

7. The method of claim 1, further comprising, while the inductor-current sense voltage is uncoupled from the node, coupling a reference voltage to the node to thereby generate, at the node, the substantially rectangular-wave sense waveform.

8. A method for estimating an average input current of a Buck switching regulator operating with duty cycle D switching frequency F, the method comprising:
    sensing an inductor current of an inductor of the buck switching regulator;
    generating an inductor-current sense voltage responsive to the operation of sensing the inductor current;
    coupling the inductor-current sense voltage to a node at the frequency F and at the duty cycle D to thereby generate a substantially square-wave sense waveform; and
    generating an average voltage of the substantially square-wave sense waveform, the average voltage being representative of the estimated average input current of the Buck switching regulator; and while the inductor-current sense voltage is uncoupled from the node, coupling a reference voltage to the node at the frequency F and at one minus the duty cycle D to thereby generate, at the node, the substantially rectangular-wave sense waveform.

9. The method of claim 8, wherein generating an average voltage of the substantially square-wave sense waveform comprises low-pass filtering the substantially square-wave sense waveform.

* * * * *